United States Patent
Ohzaki et al.

(10) Patent No.: US 10,291,620 B2
(45) Date of Patent: May 14, 2019

(54) INFORMATION PROCESSING APPARATUS, TERMINAL APPARATUS, PROGRAM, AND INFORMATION PROCESSING SYSTEM FOR COLLABORATIVE USE OF AUTHENTICATION INFORMATION BETWEEN SHARED SERVICES

(71) Applicants: Hiroki Ohzaki, Kanagawa (JP); Yasuharu Fukuda, Kanagawa (JP); Seiichi Kondo, Kanagawa (JP); Kohsuke Namihira, Kanagawa (JP); Hikaru Kominami, Kanagawa (JP)

(72) Inventors: Hiroki Ohzaki, Kanagawa (JP); Yasuharu Fukuda, Kanagawa (JP); Seiichi Kondo, Kanagawa (JP); Kohsuke Namihira, Kanagawa (JP); Hikaru Kominami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 191 days.

(21) Appl. No.: 15/352,758

(22) Filed: Nov. 16, 2016

(65) Prior Publication Data
US 2017/0149788 A1 May 25, 2017

(30) Foreign Application Priority Data

Nov. 25, 2015 (JP) ................................ 2015-230019
Jan. 29, 2016 (JP) ................................ 2016-016470

(51) Int. Cl.
*H04L 29/06* (2006.01)
*G06F 21/60* (2013.01)
(Continued)

(52) U.S. Cl.
CPC ........ *H04L 63/101* (2013.01); *G06F 16/9535* (2019.01); *G06F 21/604* (2013.01);
(Continued)

(58) Field of Classification Search
CPC . H04L 63/101; H04L 63/0815; H04L 63/083; H04L 63/0884; G06F 21/604;
(Continued)

(56) References Cited

U.S. PATENT DOCUMENTS 7,616,337 B2 * 11/2009 Hayashi ............. H04N 1/00204
358/1.15
7,821,660 B2 * 10/2010 Kitada ................ G06F 11/2028
358/1.13
(Continued)

FOREIGN PATENT DOCUMENTS

JP  2012-194773  10/2012
JP  2015-518198  6/2015

*Primary Examiner* — Eleni A Shiferaw
*Assistant Examiner* — Sher A Khan
(74) *Attorney, Agent, or Firm* — IPUSA, PLLC

(57) ABSTRACT

An information processing apparatus issuing qualification information that is used by a terminal apparatus in using a service includes an authenticating unit configured to receive an authentication request, which includes organization information, domain information, and account information in an on-premises environment, from the terminal apparatus, and search for a user belonging to an organization identified by the organization information from user administration information based on the account information in the on-premises environment in response to a correspondence between the organization information and the domain information inside organization administration information, which causes the organization information and the domain information to correspond; and a qualification information issuing unit configured to issue the qualification information to the searched user.

10 Claims, 18 Drawing Sheets

(51) Int. Cl.
*H04N 1/00* (2006.01)
*H04N 1/44* (2006.01)
*G06F 16/9535* (2019.01)

(52) U.S. Cl.
CPC .......... *G06F 21/608* (2013.01); *H04L 63/083* (2013.01); *H04L 63/0815* (2013.01); *H04L 63/0884* (2013.01); *H04N 1/00344* (2013.01); *H04N 1/444* (2013.01); *H04N 2201/0039* (2013.01); *H04N 2201/0094* (2013.01)

(58) Field of Classification Search
CPC .......... G06F 17/30867; H04N 1/00344; H04N 1/444; H04N 2201/0094
See application file for complete search history.

(56) References Cited

U.S. PATENT DOCUMENTS

| | | | |
|---|---|---|---|
| 8,891,106 B1* | 11/2014 | Haapanen | G06F 3/1204 358/1.14 |
| 9,065,863 B1* | 6/2015 | Tharakan | H04L 63/10 |
| 9,807,272 B2* | 10/2017 | Namihira | H04N 1/32534 |
| 2010/0116880 A1* | 5/2010 | Stollman | G06Q 20/10 235/380 |
| 2011/0261387 A1* | 10/2011 | Sato | G06F 3/1204 358/1.14 |
| 2013/0155444 A1* | 6/2013 | Bae | G06F 21/31 358/1.14 |
| 2013/0254847 A1* | 9/2013 | Adams | G06F 21/6218 726/4 |
| 2014/0123239 A1* | 5/2014 | Fukuda | H04L 63/104 726/4 |
| 2014/0223536 A1* | 8/2014 | Matsushima | H04L 67/10 726/11 |
| 2014/0368865 A1* | 12/2014 | Gutnik | G06F 3/1222 358/1.15 |
| 2015/0169849 A1* | 6/2015 | Takemoto | G06F 21/105 726/27 |
| 2016/0344878 A1* | 11/2016 | Asthana | G06F 3/1222 |

* cited by examiner

FIG.7

| ITEM | EXPLANATION | EXAMPLE) |
|---|---|---|
| INTERNAL ID | PRIMAL KEY IN TABLE. USED FOR INTERNAL ADMINISTRATION | 00000000000001 |
| CLIENT ID | ID FOR IDENTIFYING CLIENT | clientA |
| CLIENT KEY | SECRET KEY FOR AUTHENTICATING CLIENT | Poehjfkdng712FssfFsA |
| SERVICE TO BE PROVIDED | SERVICE PROVIDED BY CLIENT | CloudPrint |

FIG.8

| ITEM | EXPLANATION | EXAMPLE) |
|---|---|---|
| INTERNAL ID | PRIMAL KEY IN TABLE. USED FOR INTERNAL ADMINISTRATION | 00000000000001 |
| TENANT ID | ID FOR IDENTIFYING TENANT | 123456789 |
| TENANT AUTHENTICATION KEY | SECRET KEY FOR AUTHENTICATING TENANT | dHJZPLbv8otCTGAyrlwm |
| DOMAIN | DOMAIN NAME OF DIRECTORY SERVICE | ad.example.com |

FIG.9

| ITEM | EXPLANATION | EXAMPLE) |
|---|---|---|
| INTERNAL ID | PRIMAL KEY IN TABLE. USED FOR INTERNAL ADMINISTRATION | 00000000000000001 |
| TENANT ID | TENANT ID TO WHICH USER BELONGS | 123456789 |
| USER ID | ID FOR IDENTIFYING USER | userA |
| FAMILY NAME | FAMILY NAME OF USER | YAMADA |
| GIVEN NAME | GIVEN NAME OF USER | TAROU |
| MAIL ADDRESS | MAIL ADDRESS | ad_userA@example.com |
| ON-PREMISES ID | ID FOR IDENTIFYING USER IN ON-PREMISES ENVIRONMENT | ad_userA |

FIG.10

| ITEM | EXPLANATION | EXAMPLE) |
|---|---|---|
| INTERNAL ID | PRIMAL KEY IN TABLE. USED FOR INTERNAL ADMINISTRATION | 00000000000000001 |
| SERVICE TYPE | SERVICE TYPE OF LICENSE | CloudPrint |
| NUMBER OF LICENSES | NUMBER OF USERS WHO CAN USE SERVICE | 100 |
| TENANT ID | ID OF TENANT HOLDING LICENSE | 123456789 |
| IN-USE USER | USER WHO CAN USE SERVICE | userA<br>userB<br>userX |

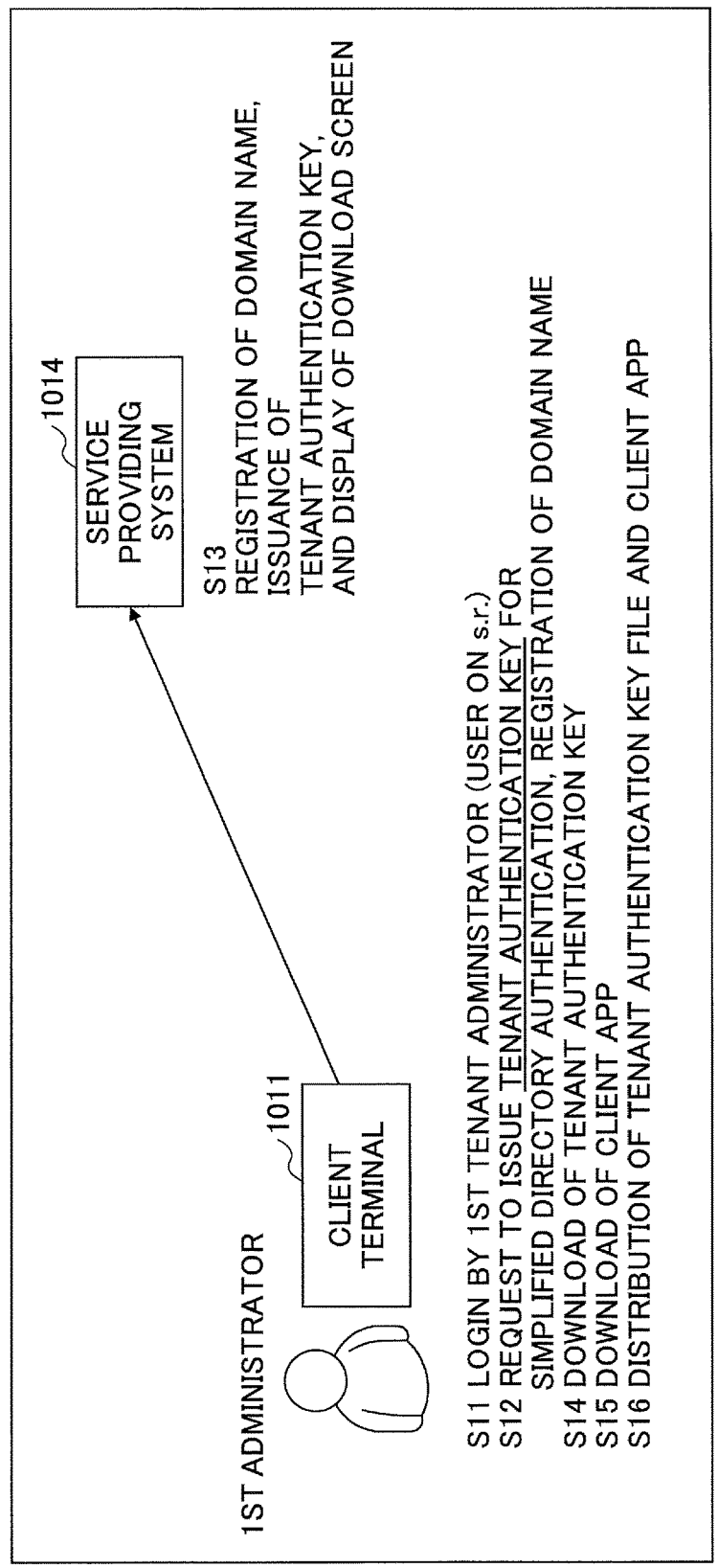

FIG.13

```
POST /login/onpremise HTTP/1.1
Content-Type: application/json; charset=utf-8
X-Client-Id: clientA
X-Client-Key: Poehjfkdng712FssfFsA
X-Tenant-Key: dHJZPLbv8otCTGAyrIwm {
 "credential": {
  "orgnaization_id": "123456789",
  "onpremise_id": "ad_userA",
  "domain": "ad.example.com"
 },
 "user": {
  "user_id": "userA",
  "mail": ["ad_userA@example.com"],
  "last_name": "Yamada",
  "first_name": "Tarou"
 },
 "service": {
  "service_class": "CloudPrint"
 }
}
```

FIG.21

CLOUD PRINT SERVICE LOGIN

TENANT ID: 123456789

☑ USE OF SIMPLIFIED DIRECTORY AUTHENTICATION

USER NAME:

PASSWORD:

LOGIN

CANCEL

INFORMATION PROCESSING APPARATUS, TERMINAL APPARATUS, PROGRAM, AND INFORMATION PROCESSING SYSTEM FOR COLLABORATIVE USE OF AUTHENTICATION INFORMATION BETWEEN SHARED SERVICES

CROSS-REFERENCE TO RELATED APPLICATIONS

The present application claims priority under 35 U.S.C. § 119 to Japanese Patent Application No. 2015-230019, filed Nov. 25, 2015 and Japanese Patent Application No. 2016-016470, filed Jan. 29, 2016, the contents of which are incorporated herein by reference in their entirety.

BACKGROUND OF THE INVENTION

Field of the Invention

The present invention relates to an information processing apparatus, a terminal apparatus, a program, and an information processing system.

Description of the Related Art

In recent years, there has been a need for the use of a cloud computing service using account information administered by an active directory (AD) in a user environment. Identification (ID) collaboration may use active directory federation services (ADFS) or an ADFS Proxy.

For example, there is a method of establishing a single ID and a single sign-on on a cloud computing platform. In this method, user qualification information associated with a computer is verified and identification information of a domain, in which a single ID is established, is received from the computer.

Next, in the above method, a directory service is formed on the cloud computing platform for a sign-on from a user in a domain in response to the verification of the user qualification information. In the above method, permission of a login for a second computer is determined in response to a determination by the directory service of accepting the qualification information associated with the login.

Further, in the above method, the qualification information associated with the login is accepted so as to access a software service provided on the cloud computing platform in response to the determination by the directory service of accepting the qualification information associated with the login (e.g., Japanese Translation of PCT International Application Publication No. JP-T-2015-518198).

SUMMARY OF THE INVENTION

According to an aspect of the present invention, there is provided an information processing apparatus issuing qualification information that is used by a terminal apparatus in using a service including an authenticating unit configured to receive an authentication request, which includes organization information, domain information, and account information in an on-premises environment, from the terminal apparatus, and search for a user belonging to an organization identified by the organization information from user administration information based on the account information in the on-premises environment in response to a correspondence between the organization information and the domain information inside organization administration information, which causes the organization information and the domain information to correspond; and a qualification information issuing unit configured to issue the qualification information to the searched user.

BRIEF DESCRIPTION OF THE DRAWINGS

FIG. 7 is a structural diagram of exemplary client information administered by a client administering unit.

FIG. 8 is a structural diagram of exemplary tenant information stored by a tenant information memory unit.

FIG. 9 is a structural diagram of exemplary user information stored by a user information memory unit.

FIG. 10 is a structural diagram of exemplary license information stored by a license information memory unit.

FIG. 11 is an explanatory diagram of an exemplary preparation of simplified directory authentication.

FIG. 13 is an explanatory diagram of an exemplary request for the simplified directory authentication.

FIG. 21 illustrates an image of an exemplary user setup screen.

DESCRIPTION OF THE EMBODIMENTS

Hereinafter, an embodiment of the present invention is described with reference to figures.

First Embodiment

<System Structure>

Figure 1:
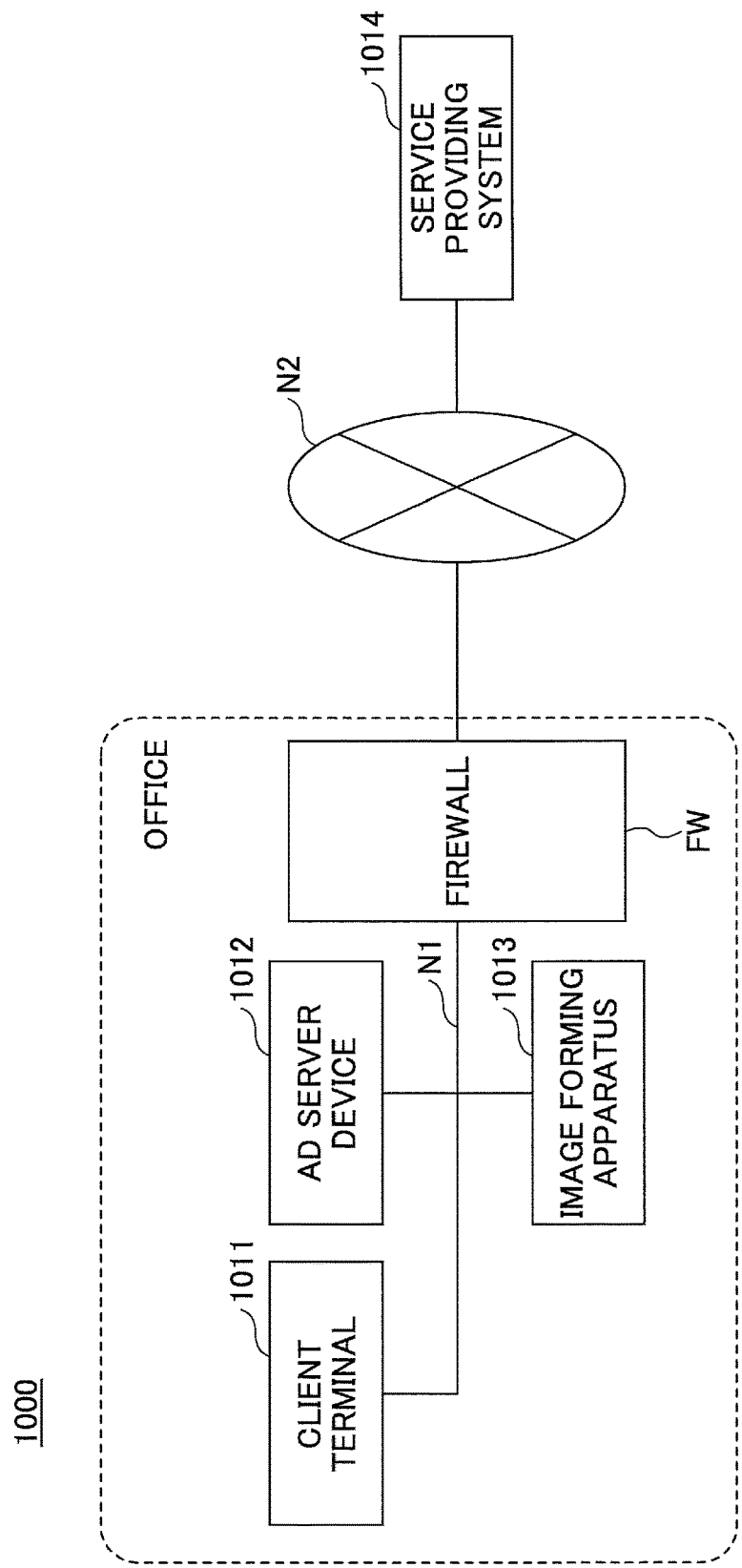
FIG. 1 is a structural diagram of an exemplary information processing system of a first embodiment of the present invention.

FIG. 1 is a structural diagram of an exemplary information processing system of the first embodiment of the present invention. The information processing system 1000 illustrated in FIG. 1 includes, for example, a network N1 in an on-premises environment such as an intra-office network and a network N2 in a cloud computing environment such as the Internet.

The network N1 is a private network located in an inside of a firewall FW. The firewall FW is installed at a node between the network N1 and the network N2. The firewall FW detects and blocks an unauthorized access. A client terminal 1011, an active directory (AD) server apparatus 1012, and an image forming apparatus 1013 such as a multifunction peripheral are coupled to the network N1.

The client terminal 1011 is an example of a terminal apparatus. The client terminal 1011 can be substantialized by an information processing apparatus, in which an ordinary OS or the like is installed. The client terminal 1011 includes a wireless communication means or a wired communication means. The client terminal 1011 is a terminal, which can be operated by a user, such as a desktop personal computer (PC), a notebook PC, a smartphone, a mobile phone, and a tablet PC.

The AD server device 1012 performs a process related to the active directory. The AD server device 1012 unifies an administration of various resources, user information, and user authority, which exist in the network N1. For example, the AD server device 1012 can unify the administration of information such as the account information of the user using various resources existing in the network N1 and access authority for various resources. The AD server device 1012 administers the users who use various resources existing in the network N1 in a unit of each domain.

The image forming apparatus 1013 is an apparatus having an image forming function such as a multifunction peripheral. The image forming apparatus 1013 is an example of the terminal apparatus. The image forming apparatus 1013 includes a wireless communication means or a wired communication means. The image forming apparatus 1013 is an apparatus of performing processes related to image formation such as a multifunction peripheral, a copier, a scanner, a printer, a laser printer, a projector, and an electronic whiteboard. Referring to FIG. 1, the number of the client terminal 1011 and the number of the image forming apparatus 1013 are one, for example. However, the numbers of the client terminal 1011 and the image forming apparatus 1013 may be multiple.

The service providing system 1014 is coupled to the network N2. The service providing system 1014 is implemented by at least one information processing apparatus. The service providing system 1014 is an example of a system providing any service to the client terminal 1011 and the image forming apparatus 1013. In the information processing system 1000, the AD server device 1012 and the service providing system 1014 use the account information of the user in the on-premises environment, which is administered in the AD server device 1012 to perform an ID collaboration between the AD server device 1012 and the service providing system 1014. The service providing system 1014 is described in detail later.

<Hardware Structure>

Figure 2:
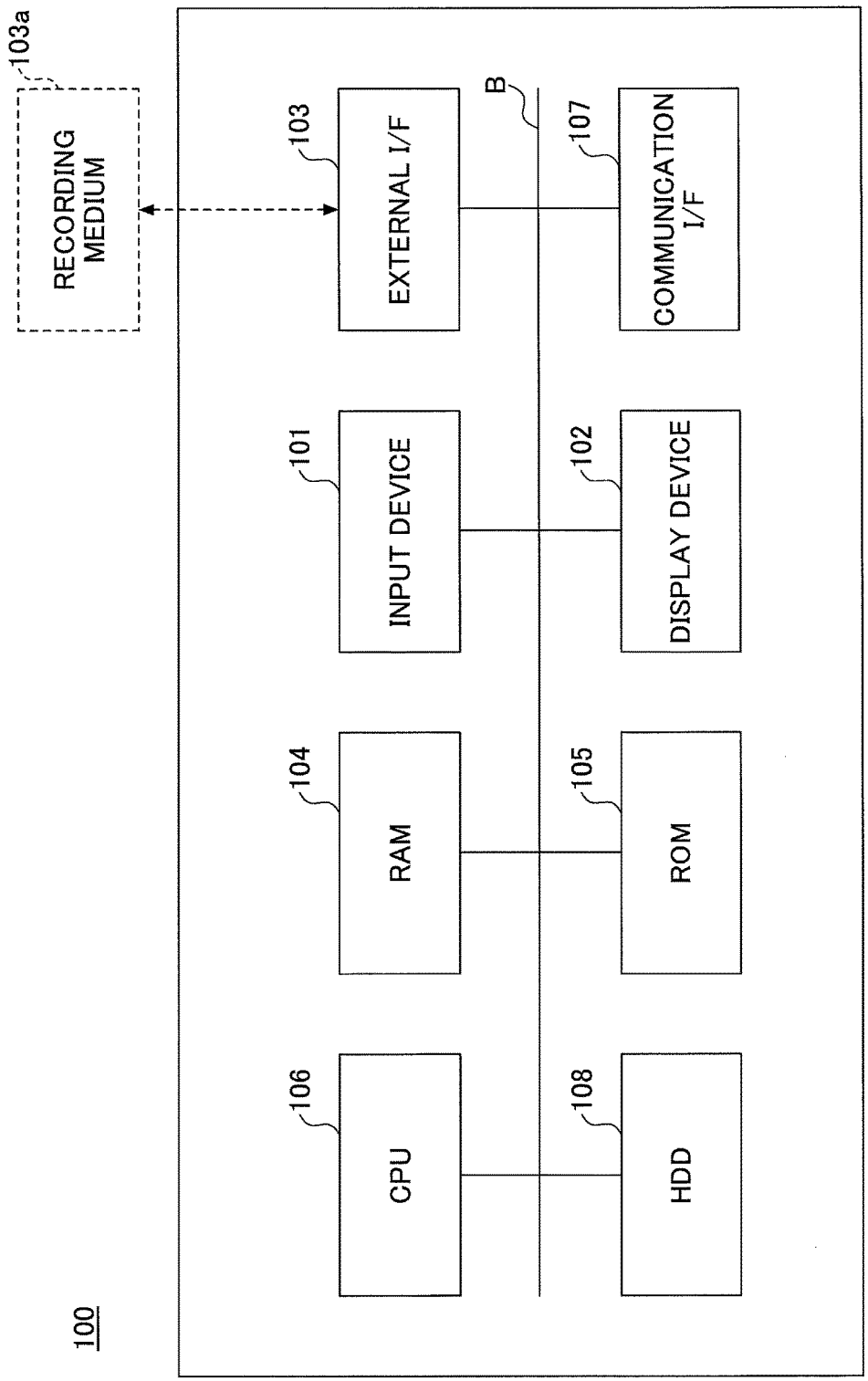
FIG. 2 is a hardware structural diagram illustrating an exemplary computer.

The client terminal 1011 and the AD server device 1012 are implemented by, for example, a computer having a hardware structure illustrated in FIG. 2. The at least one information processing apparatus implementing the service providing system 1014 is implemented by, for example, a computer having a hardware structure illustrated in FIG. 2.

FIG. 2 is a hardware structural diagram illustrating an exemplary computer. Referring to FIG. 2, the computer 100 includes an input device 101, a display device 102, an external interface (I/F) 103, a random access memory (RAM) 104, a read-only memory (ROM) 105, a central processing unit (CPU) 106, a communication interface (I/F) 107, a hard disk drive (HDD) 108, and so on, which are mutually connected by a bus B.

The input device 101 includes a keyboard, a mouse, a touch panel, or the like, by which a user can input various operation signals. The display device 102 includes a display or the like to display a processed result obtained by the computer 100. It is acceptable to use a mode where the input device 101 and the display device 102 are coupled when necessary.

The communication I/F 107 is an interface provided to couple the computer 100 to the networks N1 and N2. Thus, the computer 100 can perform data communications through the communication I/F 107.

The HDD 108 is a non-volatile memory device storing a program and data. The program and the data to be stored are an operating system (OS) being basic software controlling the entire computer 100, application software providing various functions on the OS, and so on. The computer 100 may use a drive device using a flash memory (e.g., a solid state drive (SSD)) as a memory medium in place of the HDD 108.

The external I/F 103 is an interface with an external apparatus. The external apparatus is a recording medium 103a or the like. With this, the computer 100 can read information from the recording medium 103a and/or write information to the recording medium 103a through the external I/F 103. The recording medium 103a is a flexible disk, a compact disk (CD), a digital versatile disc (DVD), a secure digital (SD) memory card, a universal serial bus (USB) memory, or the like.

The ROM 105 is a non-volatile semiconductor memory (a memory device), which can hold a program and data even when a power source is powered off. The ROM 105 stores programs and data such as a basic input/output system (BIOS), OS setup, network setup, or the like, which are executed at a time of booting up the computer 100. The RAM 104 is a volatile semiconductor memory (a memory device) temporarily storing a program and data.

The CPU 106 is an arithmetic device that reads the program or the data from the memory device such as the ROM 105 and the HDD 108. The read program or the read data undergo a process so as to substantialize a control or a function of the entire computer 100.

The hardware structure of the computer 100 of each of the client terminal 1011 and the AD server device 1012 can perform various processes described below. The at least one information processing apparatus implementing the service providing system 1014 can perform various processes described below using the hardware structure of the computer 100.

Figure 3:
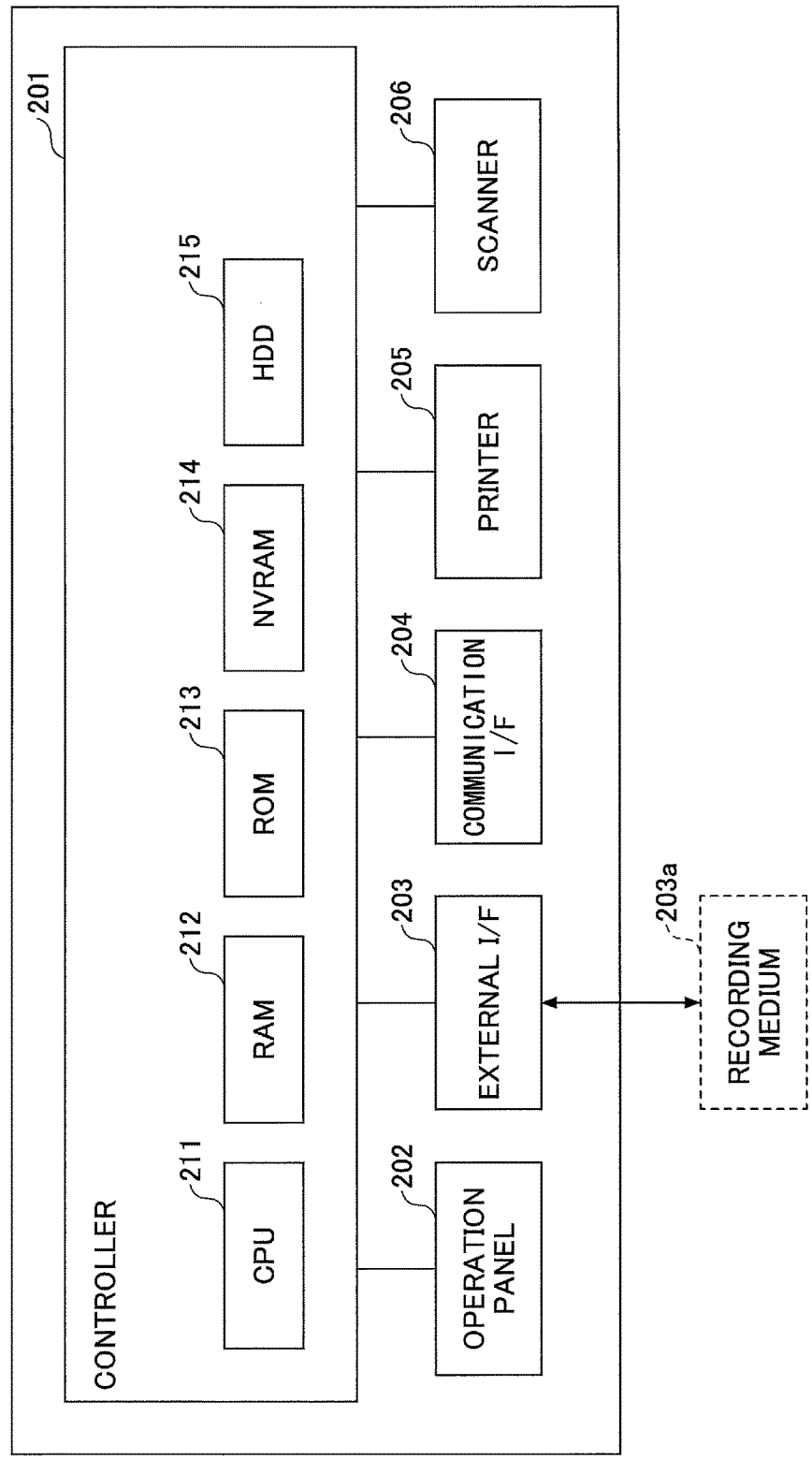
FIG. 3 is a hardware structural diagram illustrating an exemplary image forming apparatus of the first embodiment.

FIG. 3 is a hardware structural diagram illustrating an exemplary image forming apparatus of the first embodiment. The image forming apparatus 1013 illustrated in FIG. 3 includes a controller 201, an operation panel 202, an external I/F 203, a communication I/F 204, a printer 205, a scanner 206, and so on.

The controller 201 includes a central processing unit (CPU) 211, a random access memory (RAM) 212, a read-only memory (ROM) 213, a non-volatile random access memory (NVRAM) 214, a hard disk drive (HDD) 215, and so on. Various programs and data are stored in the ROM 213. The RAM 212 temporarily stores the program and the data. Setup information or the like is stored in the NVRAM 214. Various programs and data are stored in the HDD 215.

The CPU 211 reads the program, the data, setup information, or the like into the RAM 212 from the ROM 213, the NVRAM 214, the HDD 215, or the like, and performs the process. Thus, the CPU 211 substantializes the controls or the functions of the entire image forming apparatus 1013.

The operation panel 202 includes an input unit for receiving an input from the user and a display unit for performing display. The external I/F 203 is an interface with the external apparatus. The external apparatus is a recording medium 203a or the like. With this, the image forming apparatuses 1013 can perform at least one of information reading from the recording medium 203a through the external I/F 203, and information writing to the recording medium 203a through the external I/F 203. The recording medium 203a is an IC card, a flexible disk, a CD, a DVD, an SD memory card, a USE memory, or the like.

The communication I/F 204 is an interface provided to couple the image forming apparatus 1013 with the network N2. Thus, the image forming apparatus 1013 can perform data communications with another apparatus through the communication I/F 204.

The printer 205 is provided to print print data onto an object to be transferred. For example, the object to be transferred may be paper, coat paper, overhead projector (OHP) viewgraph, plastic film, prepreg, and copper foil, and is not limited to paper. The scanner 206 is a reading apparatus which reads image data (electronic data) from an original and generates an image file (an electronic file).

The image forming apparatus 1013 of the first embodiment can perform various processes described below using the above hardware structure. Explanation of the hardware structure of the firewall FW is omitted.

<Software Structure>
<<Service Providing System>>

Figure 4:
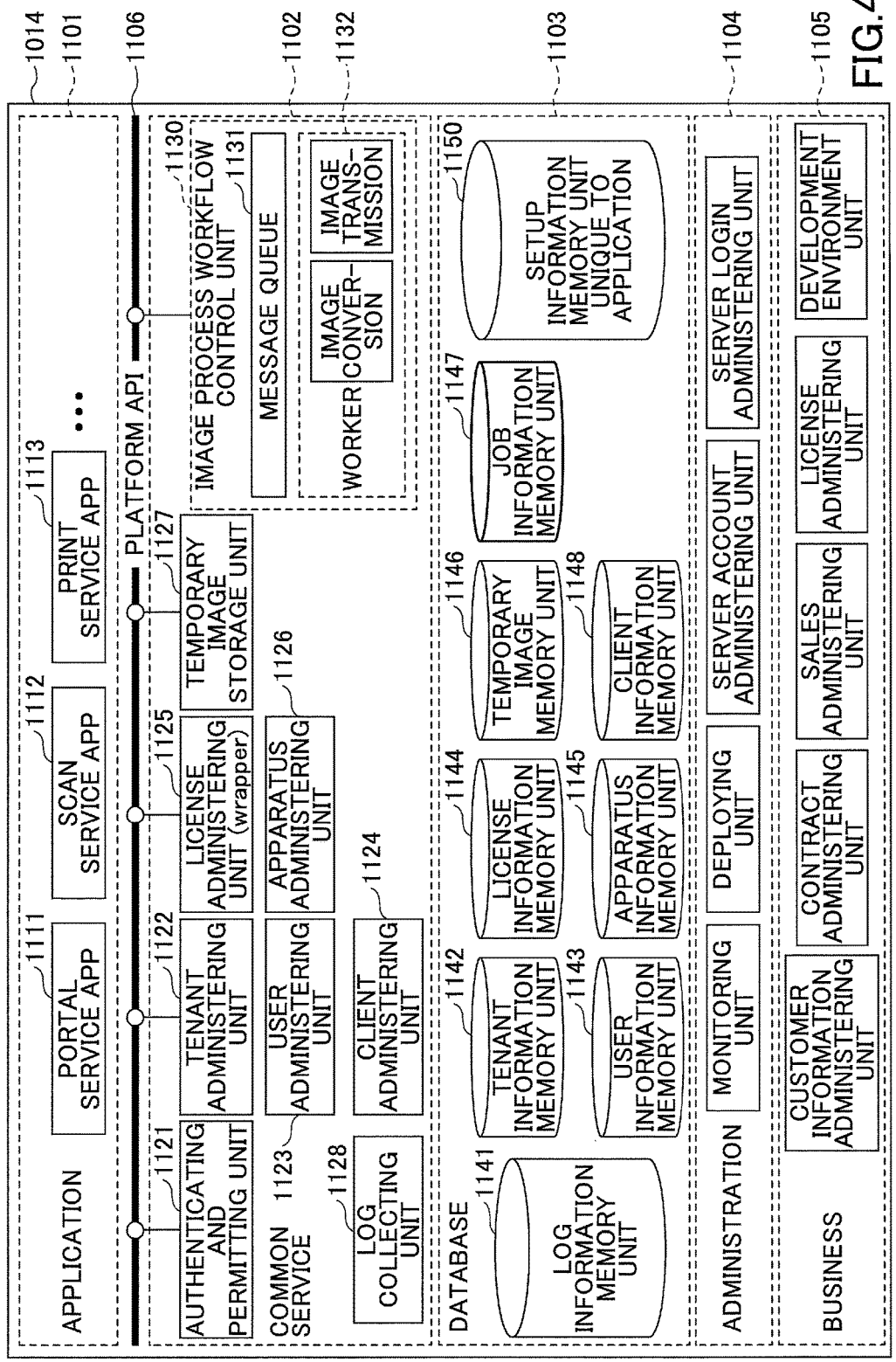
FIG. 4 is a processing block diagram of an exemplary service providing system of the first embodiment.

The service providing system 1014 of the first embodiment is substantialized by, for example, a processing block illustrated in, for example, FIG. 4. FIG. 4 is a processing block diagram of an exemplary service providing system of the first embodiment. The service providing system 1014 substantializes the processing block illustrated in FIG. 4 by executing the program.

The service providing system 1014 illustrated in FIG. 4 substantializes an application 1101, a common service 1102, a database (DB) 1103, an administration 1104, a business 1105, and a platform application programming interface (API) 1106.

The application 1101 has a portal service app 1111, a scan service app 1112, and a print service app 1113, as an example.

The portal service app 1111 is an application providing a portal service. The portal service provides a service as an entrance for using the service providing system 1014. The scan service app 1112 is an application for providing a scan service. The print service application 1113 is an application providing a print service. The application 1101 may include another service application.

The platform API 1106 is an interface used when the portal service app 1111, the scan service app 1112, and the print service app 1113, or the like uses the common service 1102. The platform API 1106 is an interface previously defined so that the common service 1102 receives a request from the application 1101. The platform API 1106 is structured by, for example, a function, a class, or the like.

The platform API 1106 can be substantialized by, for example, a Web API, which can be used through the network when the service providing system 1014 is structured by multiple information processing apparatuses.

The common service 1102 includes an authenticating and permitting unit 1121, a tenant administering unit 1122, a user administering unit 1123, a client administering unit 1124, a license administering unit 1125, an apparatus administering unit 1126, a temporary image storing unit 1126, a log collecting unit 1127, an external service administering unit 1128, and an image process workflow control unit 1130.

The image processing workflow control unit 1130 includes a message queue 1131 and at least one worker (Worker) 1132. The worker 1132 substantializes a function such as an image conversion or an image transmission.

The authenticating and permitting unit 1121 performs authentication and or permission based on an authentication request received from an office apparatus such as the client terminal 1011, the image forming apparatus 1013, or the like. The office apparatus collectively designates the client terminal 1011, the image forming apparatus 1013, or the like. The authenticating and permitting unit 1121 accesses the database and authenticates and permits the user.

Further, the authenticating and permitting unit 1121 accesses the database 1103 to authenticate the image forming apparatus 1013. Further, the authenticating and permitting unit 1121 accesses the database to perform simplified directory authentication.

The tenant administration unit 1122 administers tenant information stored in a tenant information memory unit 1142 described below. The tenant is a group unit such as an enterprise and a department. The user administering unit 1123 administers the user information stored in the user information memory unit 1143 to be described below. The client administering unit 1124 administers client information described below.

The license administering unit 1125 administers the license information stored in the license information memory unit 1144 described below. The apparatus administering unit 1126 administers apparatus information stored in the apparatus information memory unit 1145 described below. The temporary image storage unit 1127 stores a temporary image in a temporary image memory unit 1146 described below and acquires the temporary image from the temporary image memory unit 1146. The log collecting unit 1128 administers the log information stored in the log information memory unit 1141 described below.

The image process workflow control unit 1130 controls a workflow related to image processing based on a request from the application 1101. A message queue 1131 includes queues corresponding to types of the processes. The image process workflow control unit 1130 inputs a message of a request related to the process (a job) into the queue corresponding to the type of the job.

The worker 1132 monitors the corresponding queue. When the message is input in the queue, the worker 1132 performs a process such as an image conversion and an image transmission corresponding to the type of the job. The message input into the queue may be mainly read out (pull) by the worker 1132, or may be provided (push) from the queue to the worker 1132.

The database 1103 includes a log information memory unit 1141, an tenant information memory unit 1142, a user information memory unit 1143, a license information memory unit 1144, an apparatus information memory unit 1145, a temporary image memory unit 1146, a job information memory unit 1147, a client information memory unit 1148, and a setup information memory unit 1150 unique to application.

The log information memory unit 1141 stores log information. The tenant information memory unit 1142 stores tenant information. The user information memory unit 1143 stores user information. The license information memory unit 1144 stores the license information. The apparatus information memory unit 1145 stores the apparatus information.

The temporary image memory unit 1146 stores a temporary image. The temporary image is a file or data such as a scanned image processed by, for example, the worker 1132. The job information memory unit 1147 stores information (job information) of the request related to the process (the job). The client information memory unit 1148 stores client information described below. The setup information memory unit 1150 unique to application stores setup information unique to the application 1101.

Referring to FIG. 4, the administration 1104 includes, for example, a monitoring unit, a deploying unit, a server account administering unit, and a server login administering unit. Referring to FIG. 4, the business 1105 includes, for example, a customer information administering unit, a contract administering unit, a sales administering unit, a license administering unit, and a development environment unit.

The service providing system 1014 functions as an integrated platform for providing a common service such as a workflow related to the authentication and permission or image processing and a service group for providing an app service such as a scan service and a portal service.

The integrated platform is structured by, for example, the common service 1102, the DB 1103, the administration 1104, the business 110, and the platform API 1106. Further, the service group is formed by, for example, the application 1101. The service group and the integrated platform are separated in the structure of the service providing system 1014 illustrated in FIG. 4 to enable the application 1101 using the platform API 1106 to be easily developed.

A mode of classifying the processing blocks of the service providing system 1014 illustrated in FIG. 4 is an example. The application 1101, the common service 1102, the DB 1103, the administration 1104, and the business 1105 may not be classified in a hierarchy illustrated in FIG. 4. As long as the processes of the service providing system 1014 of the first embodiment can be performed, a relationship of the hierarchy illustrated in FIG. 4 may not be specifically limited.

Figure 5:
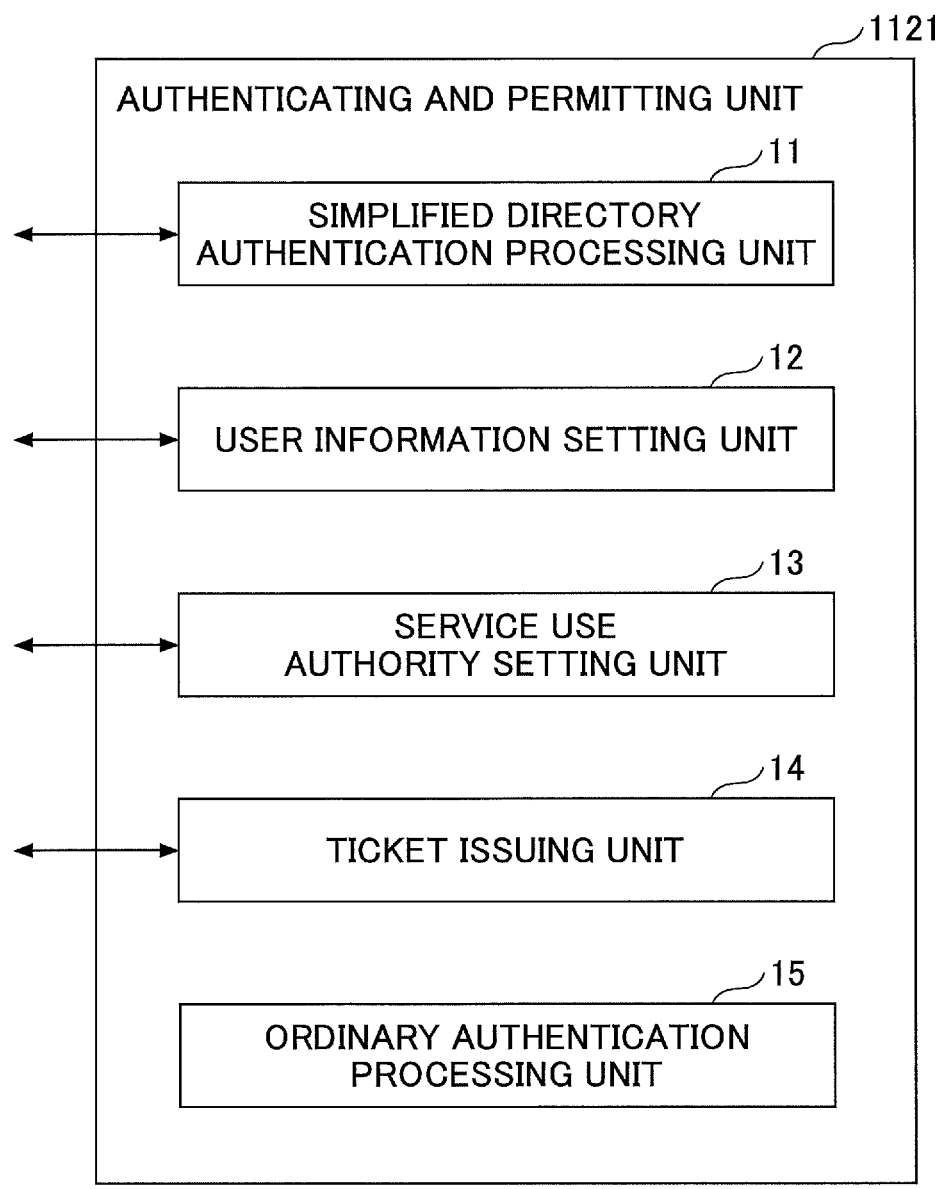
FIG. 5 is an exemplary processing block diagram of an exemplary authenticating and permitting unit.

FIG. 5 is an exemplary processing block diagram of an exemplary authenticating and permitting unit.

Referring to FIG. 5, the authenticating and permitting unit 1121 includes a simplified directory authentication processing unit 11, a user information setting unit 12, a service use authority setting unit 13, a ticket issuing unit 14, and an ordinary authentication processing unit 15.

The simplified directory authentication processing unit 11 performs simplified directory authentication described below using account information in an on-premises environment administered by the AD server device 1012. The user information setting unit 12 performs a process related to a setup of user information. The service use authority setting unit 13 performs a process related to a setup of service use authority. The ticket issuing unit 14 performs a process related to issuance of authentication ticket for using the application 1101 such as the print service app 1113. The ordinary authentication processing unit 15 performs ordinary authentication using the account information in the service providing system 1014.

Figure 6:
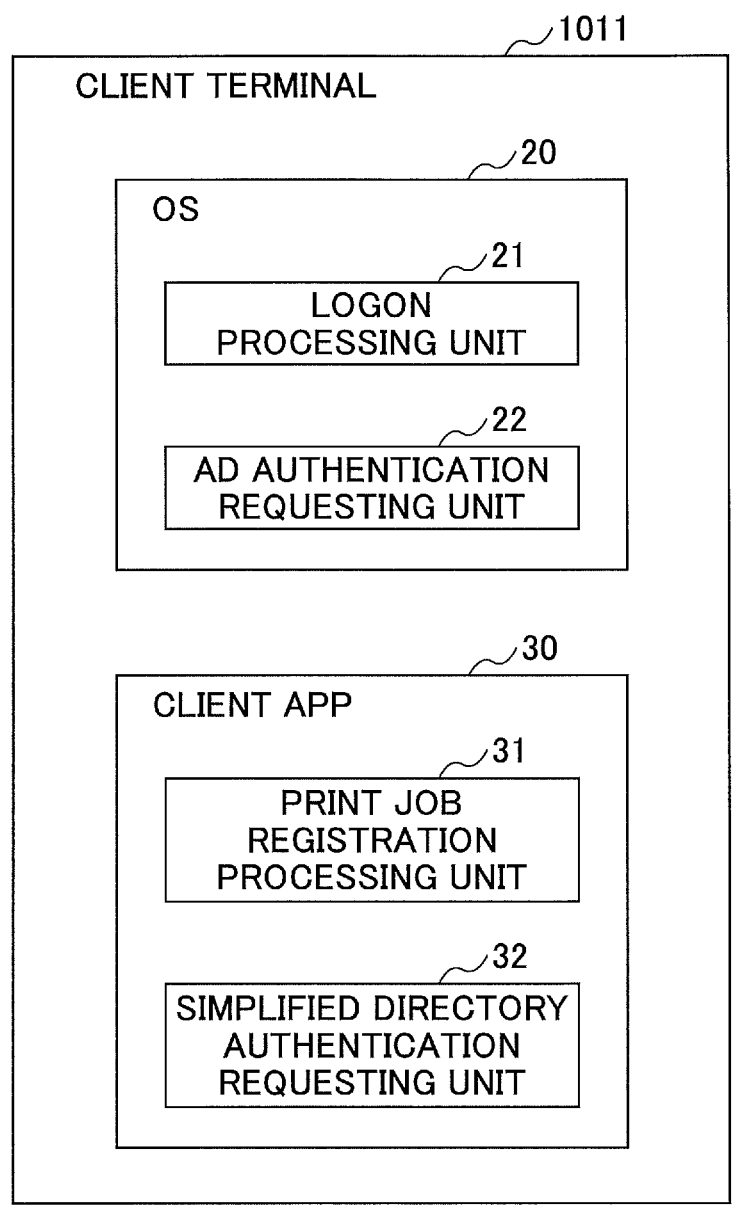
FIG. 6 is an exemplary processing block diagram of a client terminal.

FIG. 6 is an exemplary processing block diagram of a client terminal. Referring to FIG. 6, an operating system (OS) 20 and a client app 30 are installed in the client terminal 1011. The client terminal 1011 executes the OS 20 to implement a logon processing unit 21 and an AD authentication requesting unit 22. Further, the client terminal 1011 executes the client app 30 to implement a print job registration processing unit 31 and a simplified directory authentication requesting unit 32.

The logon processing unit 21 performs a process related to a logon by the user. An active directory (AD) authentication requesting unit 22 requests the AD server device 1012 to authenticate using the account information in an on-premises environment. Hereinafter, the authentication using the account information in the on-premises environment is referred to as an AD.

The print job registration processing unit 31 uses an authentication ticket issued by the authenticating and permitting unit 1121 to register the print job into the application 1101 such as the print service app 1113. The simplified directory authentication requesting unit 32 requests the authenticating and permitting unit 1121 to perform a simplified directory authentication request (described below) to be done using the account information in the on-premises environment.

FIG. 7 is a structural diagram of exemplary client information administered by a client administering unit. Referring to FIG. 7, items of the client information includes an internal ID, a client ID, a client key, and a service to be provided.

The internal ID is a primal key (a main key) for an internal administration in the database 1103. The client ID is an ID for identifying the client app 30. The client key is a secret key for authenticating the client app 30. The service to be provided is information indicative of a service provided by the client app 30.

FIG. 8 is a structural diagram of exemplary tenant information stored by a tenant information memory unit. Referring to FIG. 8, the tenant information includes items, namely, an internal ID, a tenant ID, a tenant authentication key, and a domain. The internal ID is a primal key (a main key) for an internal administration in the database 1103. The tenant ID is an ID for identifying the tenant. The tenant authentication key is a secret key for authenticating the tenant. The domain is the domain name of a directory service of an active directory or the like.

FIG. 9 is a structural diagram of exemplary user information stored by a user information memory unit. Referring to FIG. 9, the user information includes items, namely, an internal ID, a tenant ID, a user ID, a family name, a given name, a mail address, and an on-premises ID. The internal ID is a primal key (a main key) for an internal administration in the database 1103. The tenant ID is the tenant ID of the tenant to which the user belongs.

The user ID is an ID for identifying the user in the service providing system 1014. The family name is the family name of the user. The given name is the given name of the user. The mail address is the mail address of the user. The on-premises ID is the ID (hereinafter, referred to as an AD user ID) for identifying the user in the on-premises environment.

FIG. 10 is a structural diagram of exemplary license information stored by a license information memory unit. Referring to FIG. 10, the license information includes items, namely, an internal ID, a service type, the number of licenses, a tenant ID, and an in-use user. The internal ID is a primal key (a main key) for an internal administration in the database 1103.

The service type is the service type of the license. The number of licenses is the number of the users who can use the service. The tenant ID is the ID of the tenant holding the license. The in-use user is the user ID of the user who can use the service.

<Detailed Process>

Next, a detailed process of the information processing system 1000 of the first embodiment is described. Within the first embodiment, for example, a process of printing a print job that is registered in the service providing system 1014 by the image forming apparatus 1013 is described.

<<Preparation>>

FIG. 11 is an explanatory diagram of an exemplary preparation of simplified directory authentication. For example, the administrator of the tenant conducts preparation for simplified directory authentication in accordance with a procedure illustrated in FIG. 11. In step S11, the administrator of the tenant logs in the service providing system 1014 using the administrator's account. In step S12, the administrator requests the service providing system 1014 to issue a tenant authentication key for simplified directory authentication and to register a domain name.

In step S13, the service providing system 1014 registers the domain name in an item "domain" of the tenant information illustrated in FIG. 8 and issues the tenant authentication key. The service providing system 1014 registers the issued tenant authentication key in the tenant information illustrated in FIG. 8. After step S13 is processed, the tenant information illustrated in FIG. 8 is in a state where the tenant authentication key and the domain are stored. The service providing system 1014 causes the client terminal 1011 to display a download screen for enabling a file of the tenant authentication key and the client app 30 to be downloaded.

In step S14, the administrator of the tenant downloads the file of the tenant authentication key into the client terminal 1011. In step S15, the administrator of the tenant downloads the client app 30 into the client terminal 1011. In step S16, the administrator of the tenant distributes the file of the tenant authentication key and the client app 30 to the client terminal 1011 of the user who uses the simplified directory authentication. After the process up to step S16, the preparation for the simplified directory authentication is completed.

<<Print Job Registration>>

Figure 12:
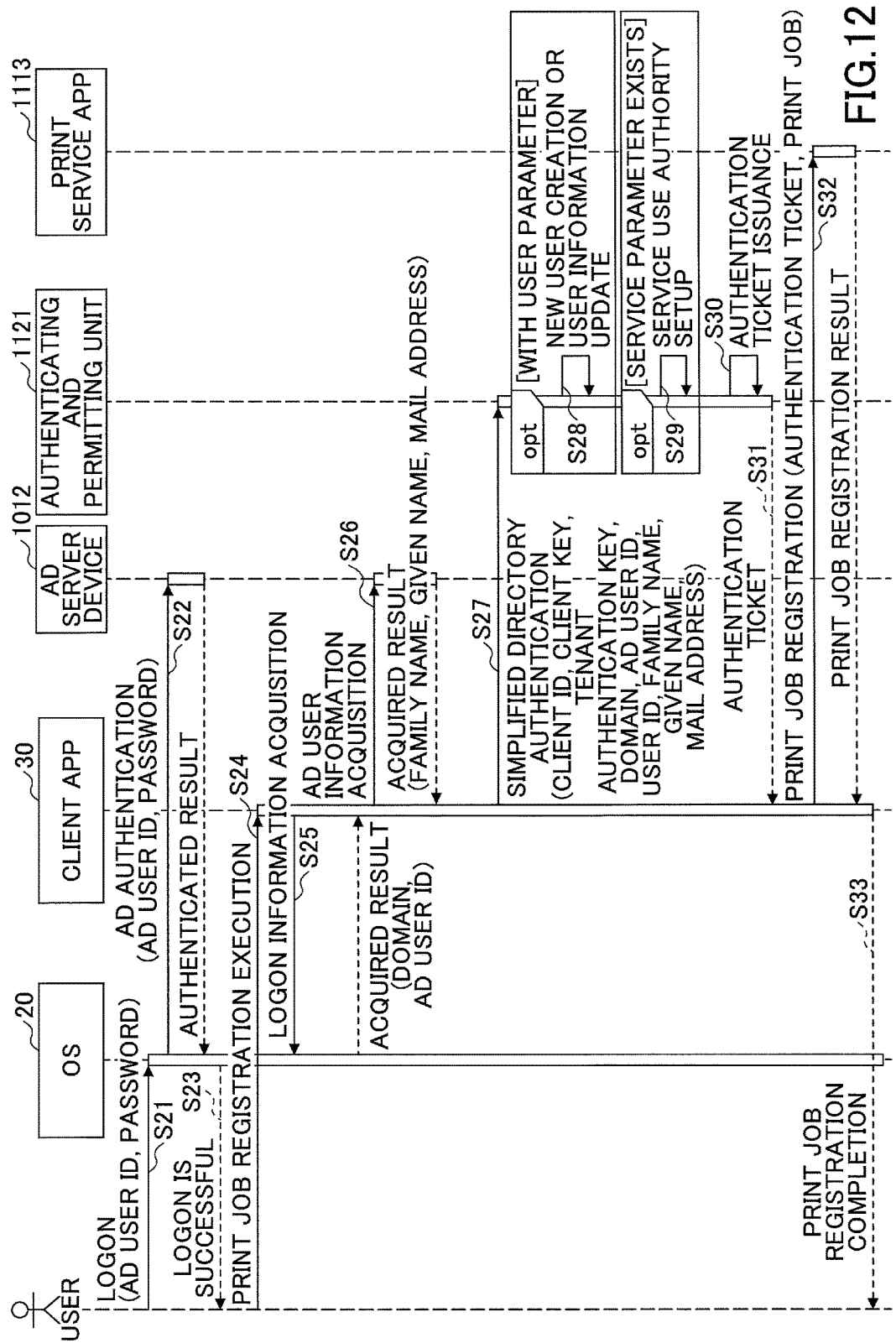
FIG. 12 is a sequence diagram illustrating an exemplary print job registration process using the simplified directory authentication.

FIG. 12 is a sequence diagram illustrating an exemplary print job registration process using the simplified directory authentication. In step S21, the user operates the client terminal 1011 participating in the domain and requests the OS 20 to log on while designating an AD user ID and a password. The logon processing unit 21 of the client terminal 1011 receives a request for logon from the user. In step S22, the AD authentication requesting unit 22 of the OS 20 requests for the AD authentication while designating the AD user ID and the password.

If a combination of the AD user ID and the password, which are designated in the AD authentication, is registered in the AD server device 1012, the AD server device 1012 returns the authenticated result indicative of the successful logon to the AD authentication requesting unit 22 of the OS 20. Here, the description is given for the case where the logon is successful. In step S23, the logon processing unit 21 of the OS 20 reports the successful logon to the user by, for example, a screen display or the like.

In step S24, the user operates the client terminal 1011 and requests the print job registration processing unit 31 of the client app 30 to execute the registration of a print job. In step S25, the simplified directory authentication requesting unit 32 of the client app 30 requests the OS 20 to acquire the logon information. The simplified directory authentication requesting unit 32 of the client app 30 acquires the domain and the AD user ID as logon information. In the sequence diagram illustrated in FIG. 12, the logon information may be acquired from the AD server device 1012.

In step S26, the simplified directory authentication requesting unit 32 of the client app 30 requests the AD server device 1012 to send the AD user information, and acquires the family name, the given name, and the mail address corresponding to the AD user ID.

In step S27, the simplified directory authentication requesting unit 32 requests the authenticating and permitting unit 1121 of the service providing system 1014 to perform the simplified directory authentication. An argument for the simplified directory authentication includes a client ID, a client key, a tenant authentication key, a domain, an AD user ID, a user ID, a family name, a given name, a mail address, and so on.

For example, the client ID and the client key embedded in the client app 30 may be used as the argument. The tenant authentication key can be read from the file of the tenant authentication key distributed in step S16. The domain and the AD user ID acquired from the OS 20 in step S25 can be used as the argument. The family name, the given name, and the mail address acquired in step S26 can be used as the argument.

The user ID is an ID for identifying the user in the service providing system 1014. The user ID of the argument for the simplified directory authentication may be the same as the AD user ID. However, if the AD user ID contains a prohibited character for the authenticating and permitting unit 1121, an appropriate value may be processed and set. The appropriate value may be set by the authenticating and permitting unit 1121.

The request for the simplified directory authentication in step S27 is done as in, for example, FIG. 13. FIG. 13 is an explanatory diagram of an exemplary request for the simplified directory authentication.

In the request for the simplified directory authentication, a client ID "client A" and a client key "Poehjfkdng712FssfFsA" is described as information of the client app 30.

A tenant ID "123456789" and a tenant authentication key "dHJZPLbv8otCTGAyrIwm" are described as the tenant information. A domain "ad.example.com" and an AD user ID "ad_userA" are described as information of the user who is logging on the OS 20. A user ID "userA", a mail address "ad_userA@example.com", a family name "Yamada", and a given name "Tarou" are described as the information of the user in the service providing system 1014. A service type "CloudPrint" is described as service information in the service providing system 1014.

Referring back to FIG. 12, the simplified directory authentication processing unit 11 of the authenticating and permitting unit 1121 conducts the process of step S28 if the user parameter is included in the request for the simplified directory authentication in step S27. In step S28, the user information setting unit 12 of the authenticating and permitting unit 1121 conducts creation of a new user or an update of user information based on a user parameter included in the request for the simplified directory authentication in step S27.

The creation of the new user is conducted by adding a record of the user information based on a user parameter included in the request for the simplified directory authentication in step S27. Further, the simplified directory authentication processing unit 11 of the authenticating and permitting unit 1121 conducts the process of step S29 if the service parameter is included in the request for the simplified directory authentication in step S27. The service use authority setting unit 13 of the authenticating and permitting unit 1121 gives the service use authority included in the request for the simplified directory authentication of step S27.

In step S30, the ticket issuing unit 14 of the authenticating and permitting unit 1121 issues an authentication ticket for using the print service app 1113. In step S31, the authenticating and permitting unit 1121 returns the authentication ticket to the client app 30.

In step S32, the print job registration processing unit 31 of the client app 30 requests the print service app 1113 to register the print job while attaching the issued authentication ticket to the print job registration request. The print service app 1113 registers the print job corresponding to the authentication ticket. The print service app 1113 returns the registered result of the print job to the print job registration processing unit 31 of the client app 30. In step S33, the print job registration processing unit 31 of the client app 30 reports a print job registration completion to the user through, for example, a screen display.

Figure 14:
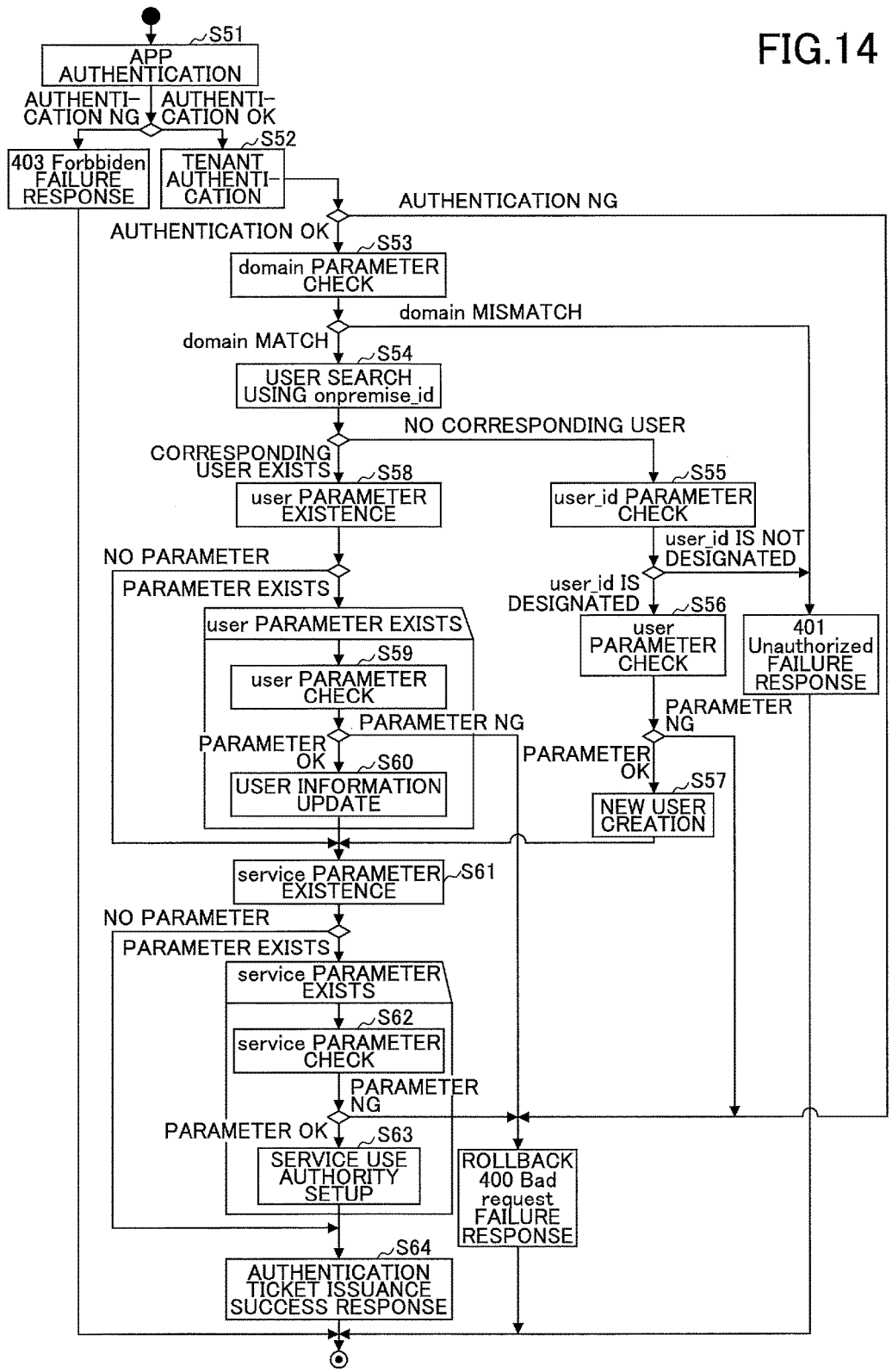
FIG. 14 is a flowchart of an exemplary simplified directory authentication process in an authenticating and permitting unit.

Referring to the sequence diagram illustrated in FIG. 12, the authenticating and permitting unit 1121 conducts the simplified directory authentication as illustrated in FIG. 14. FIG. 14 is a flowchart of an exemplary simplified directory authentication process in the authenticating and permitting unit.

In step S51, the simplified directory authentication processing unit 11 of the authenticating and permitting unit 1121 refers to the client information illustrated in FIG. 7 and conducts app authentication. The app authentication is provided to check the client ID and the client key of the client information and authenticates whether the client app 30 has already been registered.

If the client app 30 has already been registered, the process goes to step S52. In step S52, the simplified directory authentication processing unit 11 refers to the tenant information illustrated in FIG. 8 and conducts the tenant authentication. The tenant authentication checks the tenant authentication key of the tenant information to authenticate an issue where the tenant authentication key corresponds to any tenant.

If the tenant authentication key corresponds to any tenant, the simplified directory authentication processing unit 11 proceeds to step S53, refers to the tenant information, and checks a domain parameter. The domain parameter is checked to confirm whether the domain of the tenant information matches the domain of the corresponding tenant.

If the domain of the tenant information matches the domain of the corresponding tenant, the simplified directory authentication processing unit 11 proceeds to step S54 to conduct a user search using the on-premises ID. In the user search using the on-premises ID, the user information illustrated in FIG. 9 is referred to, and the user who belongs to the corresponding tenant and whose on-premises ID (an AD user ID) matches a target on-premises ID.

If the user who belongs to the corresponding tenant and whose on-premises ID (the AD user ID) matches the target on-premises ID is not searched, the simplified directory authentication processing unit 11 proceeds to step S55 to check the parameter of the user ID of the user information.

If the parameter of the user ID of the user information is designated, the simplified directory authentication processing unit 11 proceeds to step S56 to check the user parameter. If the user parameter is satisfactory as being OK, the user information setting unit 12 conducts the creation of new user in step S57.

If the user who belongs to the corresponding tenant and whose on-premises ID (the AD user ID) matches the target on-premises ID is successfully searched, the simplified directory authentication processing unit 11 proceeds to step S58 to check whether there is a user parameter. If there is the user parameter, the simplified directory authentication processing unit 11 proceeds to step S59 to check the user parameter. If the user parameter is satisfactory as being OK, the user information setting unit 12 updates the user information in step S60. For example, the update of the user information is a process of updating the family name, the given name, and the mail address in the user information illustrated in FIG. 9.

In step S61, the simplified directory authentication processing unit 11 checks whether the service parameter exists. If there is the service parameter, the simplified directory authentication processing unit 11 proceeds to step S62 to check the service parameter. If the service parameter is checked to be OK, the process goes to step S63. Then, the simplified directory authentication processing unit 11 refers to the license information illustrated in FIG. 10 to set service use authority. In the setup of the service use authority, the license information of a corresponding service type from the license information illustrated in FIG. 10 is searched, and the user ID is added to an item of the in-use user. At this time, the simplified directory authentication processing unit 11 refers to the client information illustrated in FIG. 7. If the service is not provided by the corresponding client app 30, the simplified directory authentication processing unit 11 responds to report an error. In step S64, the ticket issuing unit 14 issues an authentication ticket, and the authentication ticket is returned to the client app 3 as a successful response.

If the client app 30 has not already been registered in step S51, or if the tenant authentication key does not correspond to any tenant, the simplified directory authentication processing unit 11 returns a failure response indicative of a failure.

Further, if the domain of tenant information does not match the domain of the corresponding tenant in step S53, or if the parameter of the user ID of the user information is not designated in step S55, the simplified directory authentication processing unit 11 returns the failure response.

Further, in a case where the user parameter is not OK in step S56, in a case where the user parameter is not OK in step S59, or in a case where the service parameter is not checked OK in step S62, the simplified directory authentication processing unit 11 returns the failure response.

<<Print Job Execution>>

Figure 15:
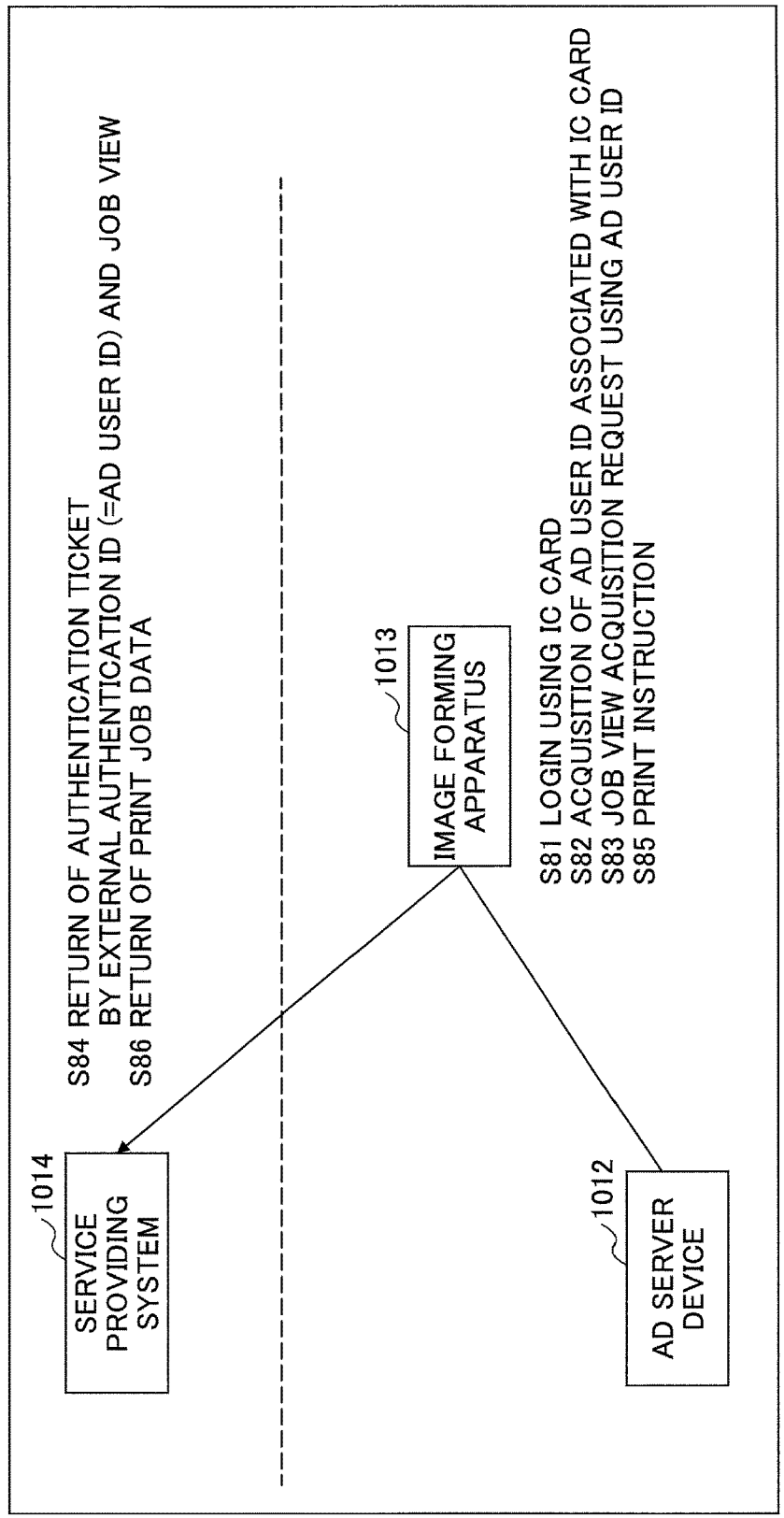
FIG. 15 is a sequence diagram illustrating an exemplary print job execution process using the simplified directory authentication.

FIG. 15 is a sequence diagram illustrating an exemplary print job registration process using the simplified directory authentication. For example, the user who registers a print job causes the image forming apparatus 1013 to execute the print job in a procedure illustrated in FIG. 15.

In step S81, the user logs in the image forming apparatus 1013 by, for example, an IC card. In step S82, the image forming apparatus 1013 acquires the AD user ID corresponding to the IC card from the AD server device 1012. In step S83, the image forming apparatus 1013 requests the service providing system 1014 to acquire a job view using the AD user ID.

In step S84, the service providing system 1014 returns the authentication ticket using the AD user ID and the job view to the image forming apparatus 1013. The image forming apparatus 1013 displays the job view and receives a print instruction ( ), in which the print job is designated, from the user. In step S85, the image forming apparatus 1013 requests the service providing system 1014 to send the print job designated by the user. In step S86, the service providing system 1014 returns the requested print job data to the image forming apparatus 1013. The image forming apparatus 1013 prints using the returned print job data.

[General Overview]

As in the sequence diagram illustrated in FIG. 12, the information processing system 1000 automatically generates the user information in the service providing system 1014 by using the account information in the on-premises environment. Further, in the information processing system 1000 of the first embodiment, a login to the service providing system 1014 is enabled by the automatically generated user information. Therefore, the information processing system 1000 of the first embodiment can easily substantialize ID collaboration using the account information in the on-premises environment without using ADFS or ADFS Proxy. Within the first embodiment, the user inputs the account information in the on-premises environment to enable the service provided by the service providing system 1014 to be used.

Second Embodiment

Because the second embodiment is similar to the first embodiment except for a part of the second embodiment, explanation is appropriately omitted.

<Detailed Process>

Next, a detailed process of the information processing system 1000 of the second embodiment is described. Within the second embodiment, for example, a process of printing a print job that is registered in the service providing system 1014 by the image forming apparatus 1013 is described.

<<Preparation>>

Figure 16:
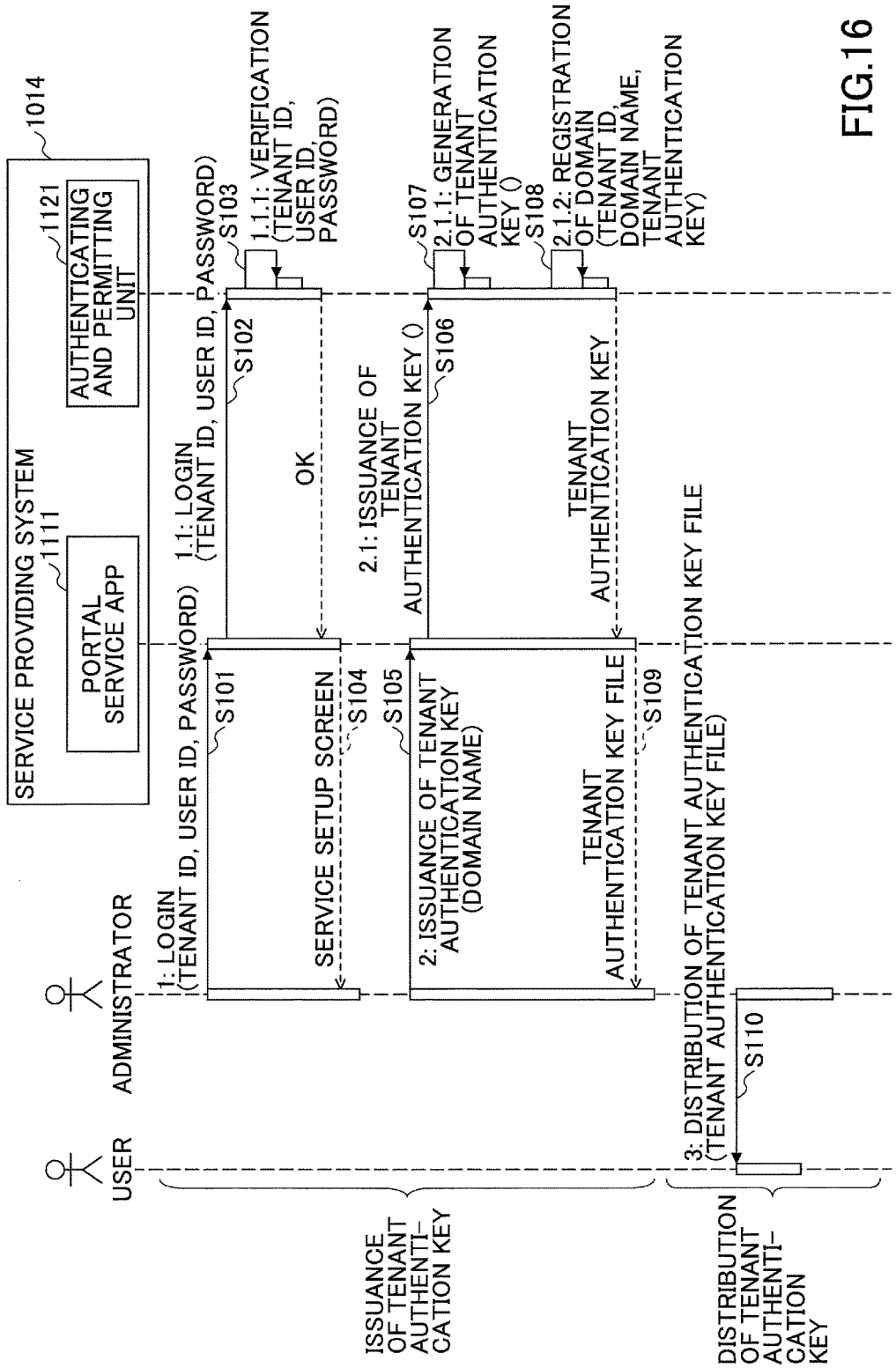
FIG. 16 is a sequence diagram of another exemplary preparation of the simplified directory authentication.

FIG. 16 is a sequence diagram of another exemplary preparation of the simplified directory authentication. For example, the administrator of the tenant conducts a preparation for the simplified directory authentication in accordance with a procedure illustrated in FIG. 16. The sequence diagram illustrated in FIG. 16 includes a procedure of issuing the tenant authentication key and a procedure of distributing the tenant authentication key.

In the sequence diagram illustrated in FIG. 16, the service providing system 1014 issues the tenant authentication key. The tenant authentication key is used for the authentication at a time of registering the print job from the client app 30 to the service providing system 1014. The sequence diagram of FIG. 16 illustrates a procedure in which the administrator of the tenant previously issues and distributes the tenant authentication key. The user and the administrator illustrated in FIG. 16 includes the client terminals 1011 respectively operated by the user and the administrator.

In step S101, the administrator of the tenant requests the portal service app 1111 of the service providing system 1014 to log in using the administrator's account. In step S102, the portal service app 1111 requests the authenticating and permitting unit 1121 to log in by the administrator's account, with which the administrator requests to log in.

In step S103, the authenticating and permitting unit 1121 verifies the administrator's account, with which the administrator requests to log in. The result of the verification is returned to the portal service app 1111. Described below is about a case where the satisfied verification result being OK is returned to the portal service app 1111. In step S104, the portal service app 1111 causes the service setup screen to be displayed in the client terminal 1011 of the administrator.

In a first procedure of steps S101 to S104, the administrator of the tenant logs in the service providing system 1014 by the administrator's account registered in the service providing system 1014. Upon this login, the service providing system 1014 can determine the tenant that issues the tenant authentication key.

Figure 17:
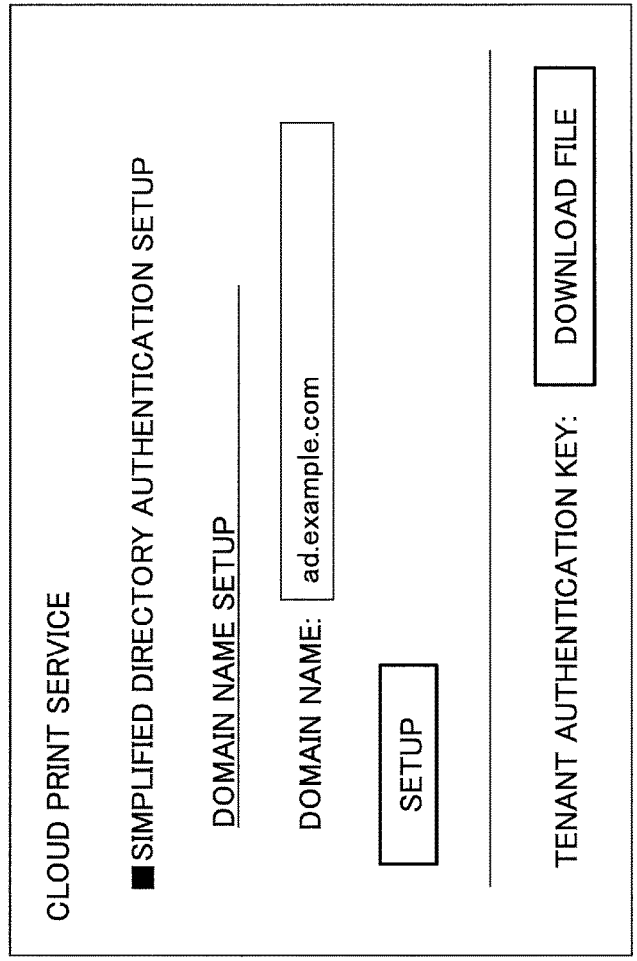
FIG. 17 illustrates an image of an exemplary service setup screen.

FIG. 17 illustrates an image of an exemplary service setup screen. A box for setting the domain name of the tenant and a button "download file" for requesting to issue the tenant authentication key are included in the service setup screen illustrated in FIG. 17. The service setup screen illustrated in FIG. 17 is displayed using, for example, a browser. The domain name of the tenant is, for example, a domain used by the AD server device 1012.

In step S105, the administrator sets the domain name to, for example, a service setup screen illustrated in FIG. 17 and can request the service providing system 1014 to issue the tenant authentication key for the simplified directory authentication. The client terminal 1011 of the administrator requests the tenant authentication key to be issued while designating the domain name.

In step S106, the portal service app 1111 requests the authenticating and permitting unit 1121 to issue the tenant authentication key while designating the domain name. In step S107, the authenticating and permitting unit 1121 issues the tenant authentication key associated with the tenant of the administrator.

In step S108, the authenticating and permitting unit 1121 registers the set domain name and the issued tenant authentication key in the tenant information illustrated in FIG. 8. The tenant information illustrated in FIG. 8 becomes in a state where the tenant authentication key and the domain are stored. The authenticating and permitting unit 1121 reports the issued tenant authentication key to the portal service app 1111.

In step S109, the portal service app 1111 downloads the file of the tenant authentication key into the client terminal 1011 of the administrator. A mode of providing the tenant authentication key to the client terminal 1011 of the administrator may be a download of the file of the tenant authentication key or a display of the text of the tenant authentication key on the browser.

In a second procedure illustrated in steps S105 to S109, the administrator of the tenant requests the service providing system 1014 to issue the tenant authentication key while designating the domain name, and acquires the file of the tenant authentication key the tenant authentication key of the tenant.

Figure 18:
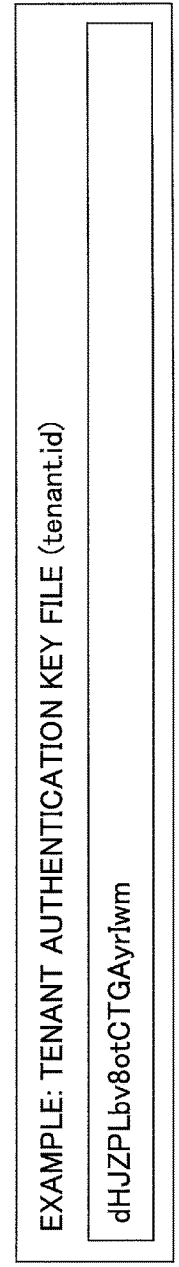
FIG. 18 is a structural diagram of an exemplary file of tenant authentication key.

FIG. 18 is a structural diagram of an exemplary file of the tenant authentication key. The tenant authentication key in the file may be encoded. The file of the tenant authentication key may be bundled with the client app and downloaded into the client terminal 1011 of the administrator from the service providing system 1014.

In step S110, the administrator of the tenant distributes the file of the tenant authentication key to the client terminal 1011 of the user. In a third procedure illustrated in step S110, the tenant authentication key is distributed to the client terminal 1011 of the user in the tenant.

Figure 19:
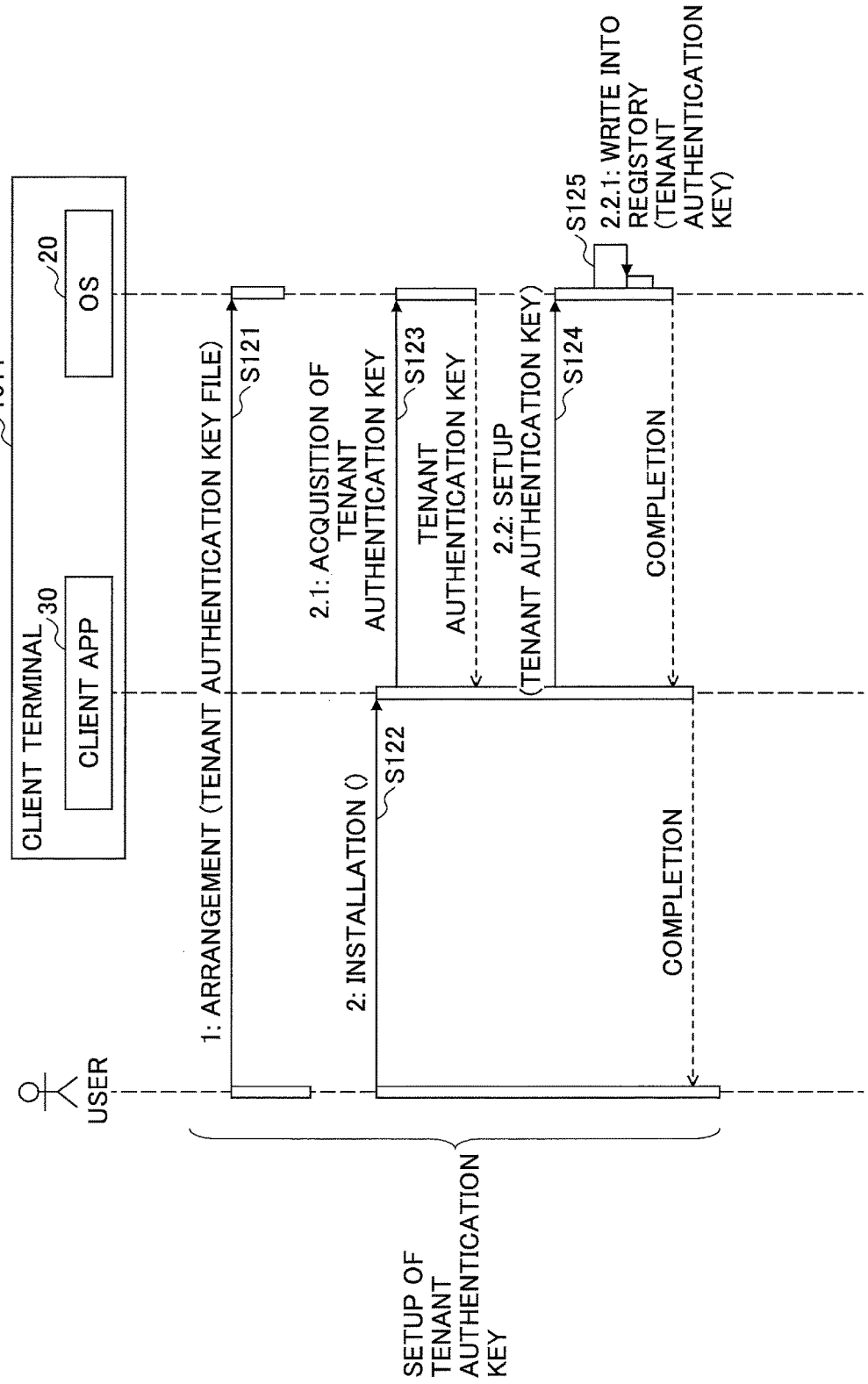
FIG. 19 is a sequence diagram of an exemplary tenant authentication key setup process.

The user, to whom the tenant authentication key is distributed, sets the tenant authentication key to the client terminal 1011 of the user in, for example, the procedure illustrated in FIG. 19. FIG. 19 is a sequence diagram of an exemplary tenant authentication key setup process of setting the tenant authentication key.

In step S121, the user disposes the distributed tenant authentication key in the OS 20 of the client terminal 1011 of the user. The disposed location of the tenant authentication key may be a file stored location (e.g., a folder) storing an installer of the client app 30 or a file stored location selected at a time of installing the client app 30. In a case where the file of the tenant authentication key bundled with the client app 30 is distributed to the client terminal 1011 of the user, the process of step S121 may not be performed.

In step S122, the user operates the client terminal 1011 to install the client app 30. In step S123, the installed client app 30 acquires the tenant authentication key from the file of the tenant authentication key in the OS 20.

In step S124, the client app 30 sets the acquired tenant authentication key to the OS 20. In step S125, the OS 20 writes the tenant authentication key to the registry to store the tenant authentication key. In a case where the tenant authentication key is encrypted, the client app 30 sets the decrypted tenant authentication key to the OS 20. After the above processes, the preparation of the simplified directory authentication is completed.

<<Print Job Registration>>

Figure 20:
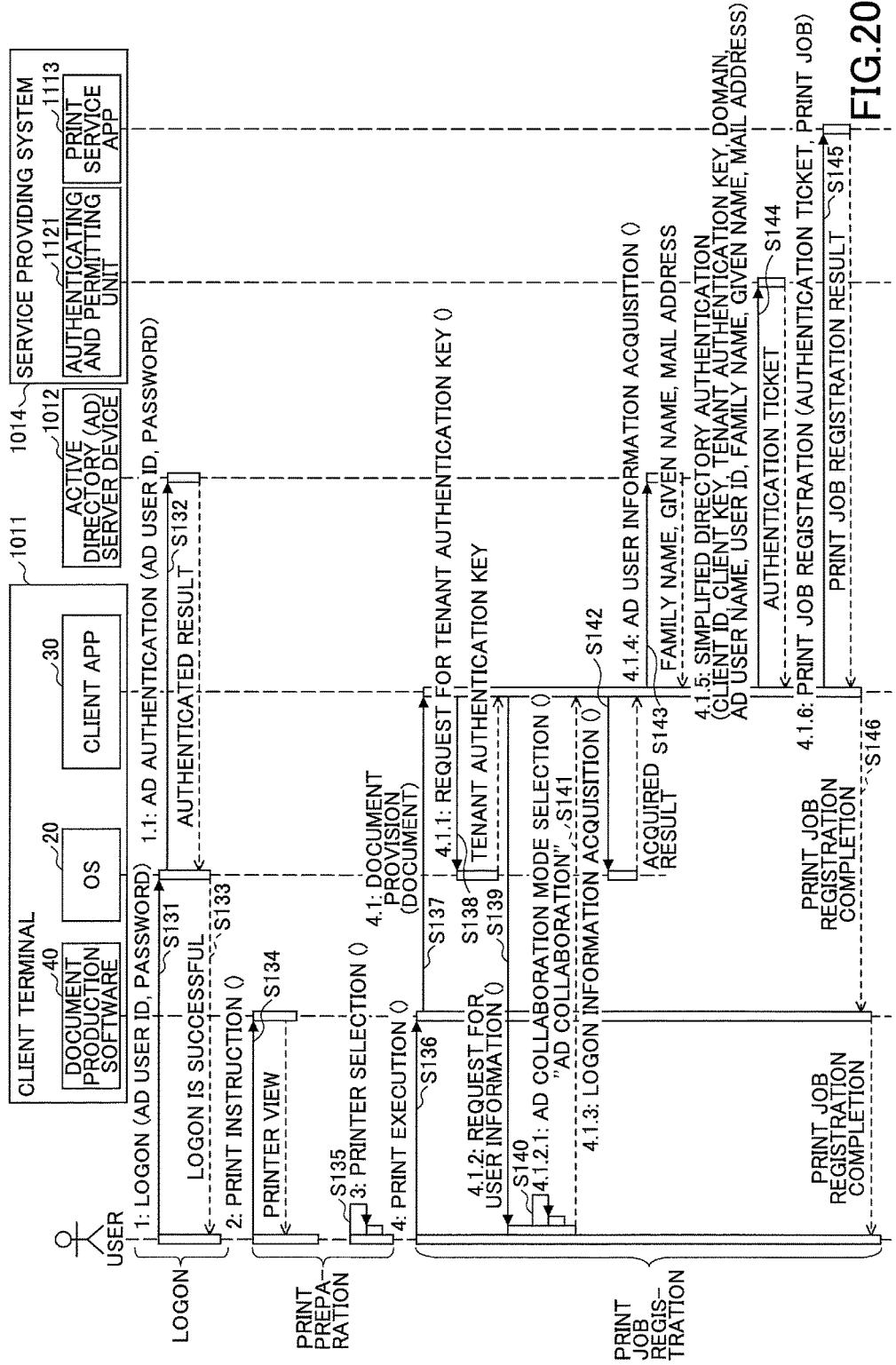
FIG. 20 is a sequence diagram illustrating another exemplary print job registration process using the simplified directory authentication.

FIG. 20 is a sequence diagram illustrating another exemplary print job registration process using the simplified directory authentication. The user registers the print job in the service providing system 1014 in the procedure illustrated in FIG. 20. The sequence diagram includes procedures of a logon, a print preparation, and a print job registration.

In step S131, the user operates the client terminal 1011 participating in the domain and requests the OS 20 to log on the client terminal 1011 while designating the AD user ID and the password. The OS 20 received the logon request from the user.

In step S132, the OS 20 requests the AD server device 1012 to conduct the AD authentication while designating the AD user ID and the password. If a combination of the AD user ID and the password, which are designated in the AD authentication, is registered in the AD server device 1012, the AD server device 1012 returns the authenticated result indicative of the successful logon to the OS 20. Here, the description is given for the case where the logon is successful.

In step S133, the OS 20 reports the user of the successful logon by, for example, the screen display. In a first procedure illustrated in steps S131 to S133, the user logs on the client terminal 1011 due to the authentication by the AD server device 1012.

In step S134, the user sends a print instruction ( ) to the existing document production software 40 to cause a printer view to be displayed. In step S135, the user operates the client terminal 1011 to send the select the printer. In a second procedure of steps S134 and S135, a printer of conducting printing is selected as a preparation for printing.

In step S136, the user operates the client terminal 1011 to instruct the print execution to the document production software 40. In step S137, the document production software 40 instructed to execute printing provides the client app 30 with a document. In step S138, the client app 30 acquires the tenant authentication key stored in the registry from the OS 20.

In a case where the tenant authentication key is acquired from the OS 20, the client app 30 displays a user setup screen illustrated in, for example, FIG. 21 in the client terminal 1011 of the user to request the user information.

FIG. 21 illustrates an image of an exemplary user setup screen. Referring to FIG. 21, the user setup screen includes a selection box (e.g., a check box) of enabling the user to select whether the simplified directory authentication is used by the user. In step S140, the user selects whether the simplified directory authentication is used. Described next is for a case where the use of the simplified directory authentication is selected. In a case where the use of the simplified directory authentication is not selected, the ordinary authentication is conducted by inputting the user name and the password, which are previously registered in the service providing system 1014, to use the print service app 1113.

In step S141, the client terminal 1011 of the user reports that the simplified directory authentication is used (an AD collaboration) to the client app 30. In step S142, the client app 30 requests the OS 20 to send the logon information. The client app 30 acquires the domain and the AD user ID as the logon information.

In step S143, the client app 30 requests the AD server device 1012 to send the AD user information, and acquires the family name, the given name, and the mail address corresponding to the AD user ID. In a case where the user information is not acquired, the client app 30 may not request the AD server device 1012 to send the AD user information.

In step S144, the client app 30 requests the authenticating and permitting unit 1121 of the service providing system 1014 to perform the simplified directory authentication. An argument for the simplified directory authentication includes a client ID, a client key, a tenant authentication key, a domain, an AD user ID, a user ID, a family name, a given name, a mail address, and so on.

In step S144, the request for the simplified directory authentication is done by the request illustrated in, for example, FIG. 13. The authenticating and permitting unit 1121 performs the simplified directory authentication process illustrated in FIG. 14, issues the authentication ticket to use the print service app 1113, and returns the issued authentication ticket to the client app 30. The client app 30 acquires the authentication ticket to be able to use the API of the print service app 1113. The authentication ticket is authentication information (information indicating that the authentication is permitted) for using the API of the print service app 1113.

When the authentication ticket is issued, the authenticating and permitting unit 1121 verifies the domain and the tenant authentication key, which are previously registered. The issued authentication ticket is stored as a cache in the client app 30 and is used at times of a second print job registration and subsequent print job registrations. The client app 30 uses the authentication ticket to convert the document into a state where the converted document can be printed by the print service app 1113.

In step S145, the client app 30 requests the print service app 1113 to register the print job while attaching the issued authentication ticket. The print service app 1113 registers the print job corresponding to the authentication ticket. The print service app 1113 returns the registered result of the print job to the client app 30. In step S146, the client app 30 reports a print job registration completion using, for example, a screen display.

<<Print Job Execution>>

The print job execution process using the simplified directory authentication is similar to the print job execution process using the simplified directory authentication in the first embodiment. Therefore, the explanation is omitted.

[General Overview]

As in the sequence diagram illustrated in FIG. 20, the information processing system 1000 of the second embodiment automatically generates the user information in the service providing system 1014 by using the account information in the on-premises environment. Further, in the information processing system 1000 of the second embodiment, a login to the service providing system 1014 is enabled by the automatically generated user information.

Therefore, the information processing system 1000 of the second embodiment can easily substantialize ID collaboration using the account information in the on-premises environment without using ADFS or ADFS Proxy.

As described, within the second embodiment, the tenant authentication key issued by the service providing system 1014 is set to the client app 30, and this tenant authentication key can be used at a time of using the service providing system 1014. The client terminal 1011 is an example of a terminal apparatus. The authentication ticket is exemplary qualification information. The simplified directory authentication processing unit 11 is an exemplary authenticating unit. The ticket issuing unit 14 is an exemplary qualification information issuing unit. The user information setting unit 12 is an exemplary user information setting unit. The service use authority setting unit 13 is an exemplary service use authority setting unit.

Within the embodiment of the present invention, the ID collaboration using the account information in the on-premises environment can be easily substantialized.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing apparatus of the present invention has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing apparatus that issues qualification information used by a terminal apparatus in using a service, the information processing apparatus comprising:
   a processor; and
   a memory storing program instructions that cause the processor to
     receive an authentication request to use an app through which the service is provided, the authentication request including organization information, domain information, app information, and account information in an on-premises environment, from the terminal apparatus,
     confirm whether the organization information and the domain information included in the authentication request corresponds to the organization information and the domain information that is included in organization administration information, and
     search user administration information for a user belonging to an organization identified by the organization information, based on the account information in the on-premises environment in a case where the organization information and the domain information included in the authentication request corresponds to the organization information and the domain information included in the organization administration information, wherein the processor
   issues the qualification information to the terminal apparatus that sent the authentication request in a case where the user belonging to the organization identified by the organization information is found in the user administration information, and
   generates new user information corresponding to the account information in the on-premises environment of the user administration information in a case where the user belonging to the organization identified by the organization information is not found in the user administration information, and issues the qualification information based on the new user information that is generated to permit the terminal apparatus that sent the authentication request to use the service associated with the app for which the authentication was requested,
   wherein the execution of the program further causes the processor to
   update the information of the user in the user administration information based on the account information in the on-premises environment in the case where the user belonging to the organization identified by the organization information is found in the user administration information.

2. The information processing apparatus according to claim 1, wherein the execution of the program further causes the processor to
   set service use authority of the user whose information is generated to authority administration information.

3. The information processing apparatus according to claim 1, wherein the execution of the program further causes the processor to
   search user administration information for the app information associated with the organization identified by the organization information; and prevent the issuance of the qualification information in response to the received authentication request from the terminal apparatus in a case where the app information is not found in the user administration information.

4. The information processing apparatus according to claim 1, wherein the execution of the program further causes the processor to prevent the issuance of the qualification information in response to the received authentication request from the terminal apparatus where authentication based on the organization information is unsuccessful.

5. A terminal apparatus that uses a service provided by the information processing apparatus according to claim 1 using the qualification information issued by the information processing apparatus, the terminal apparatus comprising:

another processor; and another memory storing program instructions that cause the another processor to send the authentication request to use the app through which the service is provided, the authentication information including the organization information, the domain information, the app information, and the account information in the on-premises environment, to the information processing apparatus, and acquire the qualification information issued by the information processing apparatus in response to the authentication request in a case where the organization information and the domain information included in the authentication request corresponds to the organization information and the domain information included in the organization administration information stored at the information processing apparatus;

use the qualification information provided by the information processing apparatus to use the service requiring the qualification information, wherein the another processor sends the authentication request including the organization information, the domain information, the app information, and the account information in the on-premises environment to the information processing apparatus in response to an event where the organization information issued corresponding to the domain information in the information processing apparatus.

6. The terminal apparatus according to claim 5, wherein the authentication requesting unit executes authentication requested in the authentication based on the account information in the information processing apparatus in-a case where the organization information and the domain information included in the authentication request does not correspond to the organization information—and the domain information at the information processing apparatus.

7. The information processing apparatus according to claim 1, wherein the app provides a printing service, and the terminal apparatus uses the issued qualification information to convert document information into a format that can be printed via the app.

8. The terminal apparatus according to claim 5, wherein the app provides a printing service, and the terminal apparatus uses the issued qualification information to convert document information into a format that can be printed via the app.

9. An information processing system including at least one information processing apparatus, the information processing apparatus of the information processing system comprising:

a processor; and a memory storing program instructions that cause the processor to provide a service to a terminal apparatus requesting by designating qualification information that is provided for using the service, receive an authentication request to use an app through which the service is provided, the authentication request including organization information, domain information, app information, and account information in an on-premises environment, from the terminal apparatus, confirm whether the organization information and the domain information included in the authentication request corresponds to the organization information and the domain information that is included in organization administration information, and search user administration information for a user belonging to an organization identified by the organization information, based on the account information in the on-premises environment in-case where the organization information and the domain information included in the authentication request corresponds to the organization information and the domain information included in the organization administration information, wherein the processor in a case where the user belonging to the organization identified by the organization information is found in the user administration information, and generates new user information corresponding to the account information in the on-premises environment of the user administration information in a case where the user belonging to the organization identified by the organization information is not found in the user administration information, and issues the qualification information based on the new user information that is generated to permit the terminal apparatus that sent the authentication request to use the service associated with the app for which the authentication was requested, wherein the execution of the program further causes the processor to update the information of the user in the user administration information based on the account information in the on-premises environment in the case where the user belonging to the organization identified by the organization information is found in the user administration information.

10. The information processing system according to claim 9, wherein the app provides a printing service, and the terminal apparatus uses the issued qualification information to convert document information into a format that can be printed via the app.

* * * * *